(12) United States Patent
Ueda

(10) Patent No.: US 7,692,735 B2
(45) Date of Patent: Apr. 6, 2010

(54) DISPLAY DEVICE

(75) Inventor: Shiro Ueda, Chiba (JP)

(73) Assignee: Hitachi Displays, Ltd., Chiba (JP)

( * ) Notice: Subject to any disclaimer, the term of this patent is extended or adjusted under 35 U.S.C. 154(b) by 295 days.

(21) Appl. No.: 11/480,520

(22) Filed: Jul. 5, 2006

(65) Prior Publication Data
US 2007/0008450 A1    Jan. 11, 2007

(30) Foreign Application Priority Data
Jul. 8, 2005    (JP) .............................. 2005-199796

(51) Int. Cl.
*G02F 1/1335*    (2006.01)
(52) U.S. Cl. ...................................... 349/62
(58) Field of Classification Search .................. 349/64, 349/70, 62
See application file for complete search history.

(56) References Cited
U.S. PATENT DOCUMENTS
6,661,480 B2 * 12/2003 Fujishiro et al. ............ 362/600
7,159,999 B2 * 1/2007 Yoo et al. ................... 362/249
2005/0162582 A1 * 7/2005 Kitada et al. ................. 349/58

FOREIGN PATENT DOCUMENTS
JP          6-230376        2/1993

* cited by examiner

*Primary Examiner*—Jerry T Rahll
(74) *Attorney, Agent, or Firm*—Stites & Harbison PLLC; Juan Carlos A. Marquez, Esq.

(57) ABSTRACT

There is disclosed a display device having a display panel which is prevented from being scratched if an optical member such as a diffusive plate located behind the display panel swings. The display device has the display panel, an array of light sources disposed behind the display panel, and the optical member disposed between the display panel and the array of light sources. The distance between a first end of the optical member and the display panel is set greater than the distance between a second end of the optical member and the display panel, the second end being opposite to the first end.

8 Claims, 5 Drawing Sheets

DISPLAY DEVICE

The present application claims priority from Japanese application JP2005-199796 filed on Jul. 8, 2005, the content of which is hereby incorporated by reference into this application.

BACKGROUND OF THE INVENTION

The present invention relates to a display device, and more particularly, to a technique effectively applied to a large-area display device having a backlighting arrangement such as a liquid crystal TV set.

Heretofore, liquid crystal displays have been available as display devices for displaying images.

The liquid crystal displays have been widely used as liquid crystal displays for liquid crystal TV sets and for personal computers (PCs) in recent years. In these years, such display devices have become increased in size.

When images are displayed on the liquid crystal displays, light sources are necessary. For example, a backlighting arrangement using fluorescent lamps such as cold cathode tubes or hot cathode tubes is mounted behind a liquid crystal display panel. The backlighting arrangement is an illuminating device having one or more fluorescent lamps disposed, for example, above a reflective plate, and an optical member such as a diffusive plate is disposed above the fluorescent lamps. In this backlighting arrangement, light emanating from the fluorescent lamps and directed toward the liquid crystal display panel is transmitted to the optical member such as the diffusive plate directly or after being reflected by the reflective plate. The optical member makes a flat panel-like form of light rays with less brightness uniformity. The light rays are then transmitted through the liquid crystal display panel.

In recent years, a structure using an optical transmitter has been proposed as one type of the backlighting arrangement (see, for example, patent reference 1). In the backlighting arrangement using the optical transmitter, this transmitter is disposed, for example, behind the liquid crystal display panel. Light sources such as the aforementioned fluorescent lamps are placed at an end of the optical transmitter.

[Patent reference 1] JP-A-6-230376

Of the above-described liquid crystal displays, in the display device having the optical member such as the diffusive plate disposed between the liquid crystal display panel and the light sources, the optical member is placed and held parallel to the liquid crystal display panel. The liquid crystal display panel, the optical member, and the light sources are held together by frame members. Since the liquid crystal panel and the optical member are held at their respective ends by the frame members, they swing when vibrations are applied. Especially, the optical member such as the diffusive member easily swings. Swinging motion of the optical member due to vibrations is produced in the direction in which the liquid crystal display panel and the optical member are disposed and so if vibrations are applied to the liquid crystal display device, the optical member may touch the liquid crystal display panel.

Normally, polarizers are stuck to both faces of the liquid crystal display panel to enhance the contrast. Therefore, if the optical member swings due to vibrations, and if the optical member touches the polarizers, scratching them, the contrast deteriorates in these scratched portions. This presents the problem that the image quality deteriorates.

SUMMARY OF THE INVENTION

It is an object of the present invention to provide a technique which is used for a display device having an optical member disposed between a display panel and an array of light sources and which is capable of preventing the display panel from being scratched by swinging motion of the optical member due to vibrations.

The foregoing and other objects of the present invention and novel features thereof will become apparent from the description given herein and accompanying drawings.

The invention disclosed herein is summarily described below.

(1) A display device having a display panel, an array of light sources disposed behind the display panel, and an optical member disposed between the display panel and the array of light sources. The optical members has first and second ends which are opposite to each other. The distance from the first end to the display panel is greater than the distance from the second end to the display panel.

(2) A display device based on the means (1) above, wherein the first and second ends are on the upper side and lower side, respectively, of the display panel.

(3) A display device based on the means (2) above, wherein the display panel, the optical member, and the array of light sources are held by frame members and that each frame member has first and second spacers. The first spacer is interposed between the first end of the optical member and the display panel. The second spacer is interposed between the second end and the array of light sources, the second end being opposite to the first end of the optical member.

(4) A display device based on any one of the means (1), wherein the array of light sources has plural fluorescent lamps each extending along the first end of the optical member. The fluorescent lamps are arranged in the direction directed from the first end to the second end. The fluorescent lamps are spaced from each other more widely near the first end than near the second end.

(5) A display device based on any one of the means (1), wherein there are further provided a reflective plate and support members having their respective one ends fixedly mounted to the reflective plate. The reflective plate is disposed on the opposite side of the array of light sources from the display panel. The support members are mounted between the fluorescent lamps. The support members are increased in height in going from the first end toward the second end.

In the display device according to the present invention, the distance from the first end of the optical member to the display panel and the distance from the second end to the display panel are different, the second end being opposite to the first end, as in the means (1) described above. The optical member is a diffusive plate, for example. In other words, in the means (1), the optical member is disposed at an angle to the display panel. Where the first end is on the upper side of the display panel and the second side is on the lower side of the display panel as in the means (2) described above, if the display device vibrates, the optical member can be prevented from being swung toward the display panel. Therefore, the optical member can be prevented from touching the display panel; otherwise, the display panel or the optical member would be scratched. The upper and lower sides of the display panel in the means (2) are the upper and lower sides, respectively, of the display panel when the display device is installed, for example, on a desk.

The display panel, the optical member, and the array of light sources are normally held by frame members. Therefore, the optical member can be held obliquely by mounting a first spacer interposed between the first end of the optical member and the display panel and a second spacer interposed between the second end and the array of light sources as in the means (3), the second end being opposite to the first end of the optical member.

The position of the diffusive plate between the display panel and the array of light sources varies from location to location by disposing the optical member at an angle to the display panel. Therefore, in the case of a display device such as the means (1) to (3), the spacing between the light sources is increased with increasing the distance between the display panel and the optical member as in the means (4). Thus, the diffusivity for light can be made uniform. Brightness nonuniformity can be reduced.

In the display device having the optical member, the optical member is supported by support members, which in turn are fixedly mounted to the reflective plate. Therefore, in the case of the display device as in the means (1) to (4), the support members are preferably increased in height in going toward the second end from the first end as in the means (5).

Embodiments of the present invention are hereinafter described in detail with reference to the drawings. In all the figures illustrating the embodiments, those components having the same functions are indicated by the same reference numerals and their repeated description will be avoided.

DETAILED DESCRIPTION OF THE PREFERRED EMBODIMENTS

In the display device according to the present invention, an optical member such as a diffusive plate is disposed between a display panel and an array of light sources. The optical member is disposed at an angle to the display panel. Under this condition, the optical member is so positioned that the distance between the optical member and the display panel increases in going towards the top side of the display device from the bottom side. In this configuration, if vibrations are applied to the display device, the optical member is prevented from being swung toward the display panel; otherwise, the display panel or the optical member would be scratched.

Figure 1:
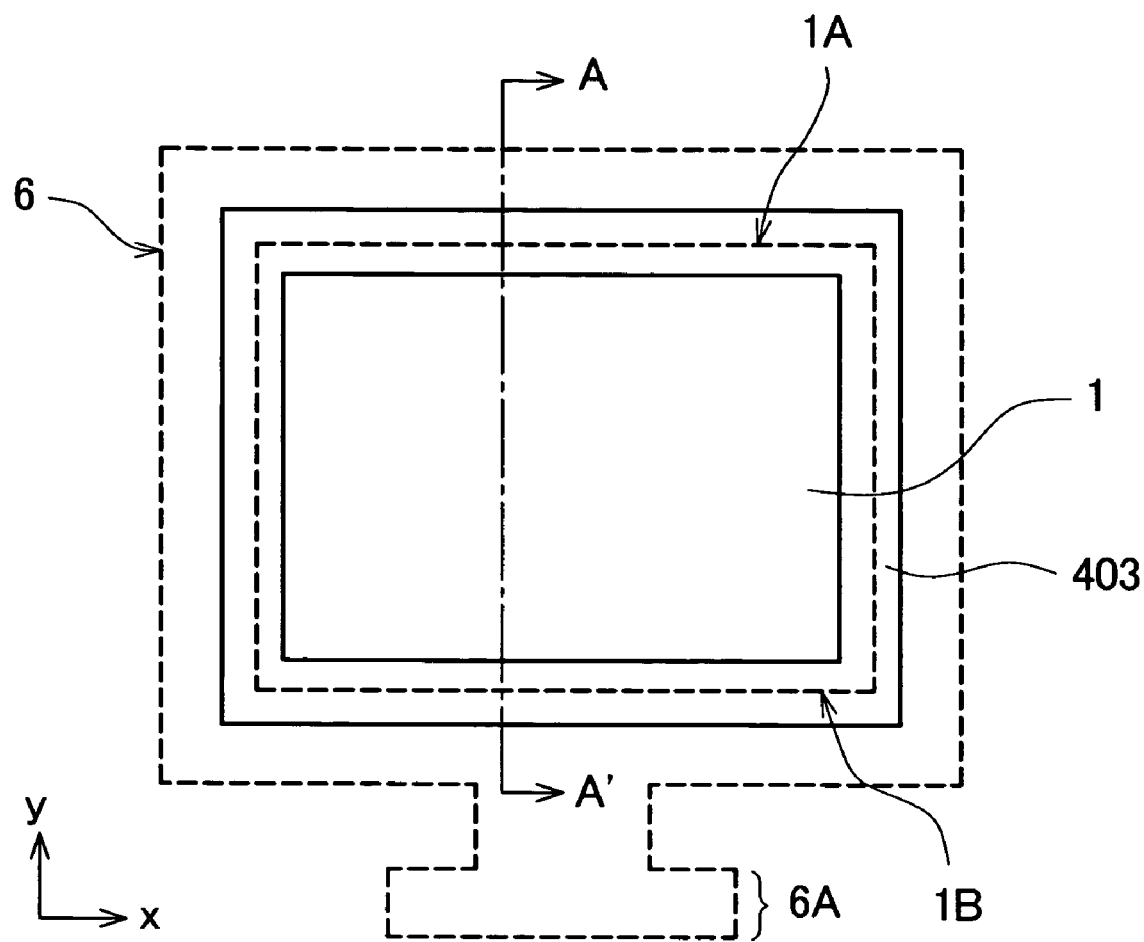
FIG. 1 is a schematic front elevation schematically showing the configuration of a display device according to one embodiment of the present invention.
Figure 2:
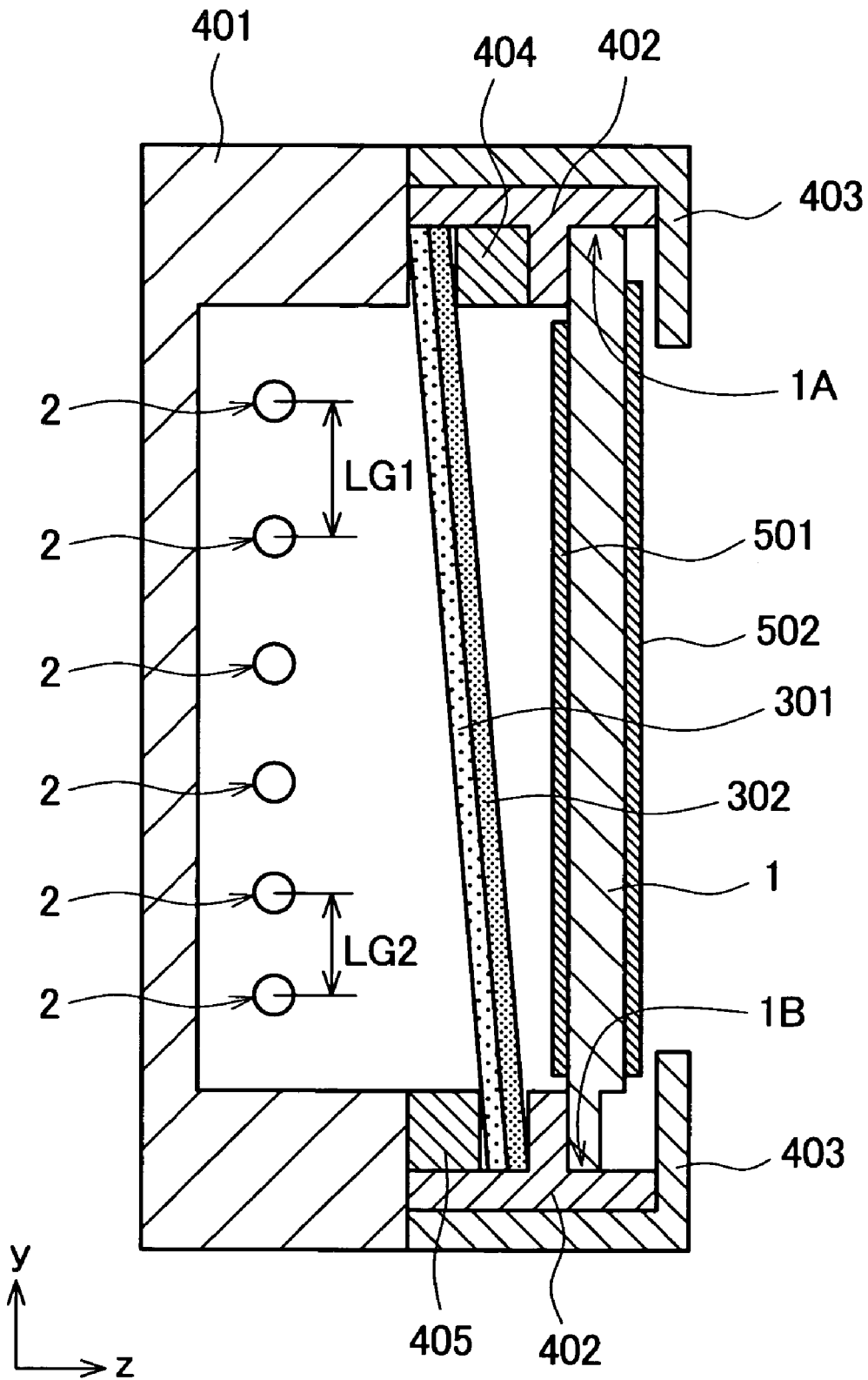
FIG. 2 is a cross-sectional view taken on line A-A' of FIG. 1, schematically showing the configuration of the display device according to the embodiment of the invention.

FIGS. 1 and 2 are views schematically showing the configuration of a display device according to one embodiment of the present invention. FIG. 1 is a front elevation of the display device. FIG. 2 is a cross-sectional view taken on line A-A' of FIG. 1.

In FIGS. 1 and 2, a display panel 1 has an upper side 1A and a lower side 1B. Also shown are an array of light sources 2, a diffusive plate 301, an optical sheet 302, a first frame member 401, a second frame member 402, a third frame member 403, a first spacer 404, a second spacer 405, polarizers 501, 502, and an enclosure 6. The enclosure has a pedestal portion 6A.

The display device according to the present embodiment has the display panel 1, the array of light sources 2 arranged behind the display panel 1, and optical members disposed between the panel 1 and the array of the light sources 2, for example, as shown in FIGS. 1 and 2. The optical members include the diffusive plate 301 and optical sheet 302. The display panel 1, array of light sources 2, and optical members are held together by the frame members. The light sources 2 are held to the first frame member (lower frame) 401. For example, the optical members and display panel 1 are held such that their upper and lower ends (as viewed in the plane of the paper) are sandwiched between parts of the second frame member 402. The first frame member 401 and the second frame member 402 are held together by the third frame member (upper frame) 403. A reflective plate (not shown in FIG. 2) is mounted between the first frame 401 and the array of the light sources 2. Support members (not shown in FIG. 2) supporting the optical members and light sources 2 stand upright from the reflective plate.

The display panel 1 consists, for example, of a liquid crystal display panel. As shown in FIG. 2, a pair of polarizers 501 and 502 is stuck to the panel. Since the liquid crystal display panel 1 and polarizers 501, 502 may be identical in structure with liquid crystal display panel and polarizers of a related-art display device, their detailed description is omitted.

Each of the light sources 2 is a fluorescent lamp, for example, such as a cold cathode fluorescent lamp or hot cathode fluorescent lamp. Each of the fluorescent lamps is a pillar-like fluorescent lamp extending, for example, in the x-direction (as viewed in FIG. 1). The plural fluorescent lamps are arranged in the y-direction as shown in FIG. 2. Since the light sources 2 (fluorescent lamps) may be identical in kind and shape with fluorescent lamps of a related-art display device, their detailed description is omitted.

The optical members such as the diffusive plate 301 and optical sheet 302 are members which diffuse the light emitted from the light sources 2 and shape the light into a uniform planar form. As shown in FIG. 2, the optical members are overlapped between the display panel 1 and the array of the light sources 2. Since the optical members may be identical in kind and material with optical members of a related-art display device, their detailed description is omitted.

In the display device according to the present embodiment, the optical members are disposed at an angle to the display panel 1 as shown in FIG. 2. That is, the optical members are so disposed that the distance between the end (first end) of each optical member on the side of the upper side 1A of the display panel and the display panel 1 is greater than the distance between the end (second end) on the side of the lower side 1B of the display panel and the display panel 1. The first end of each optical member is held to the display panel 1 via the first spacer 404. The second end is held to the array of the light sources 2 via the second spacer 405. Thus, the optical members are disposed at an angle to the display panel 1. The first spacer 404 and second spacer 405 are made of a resilient material such as rubber or sponge or a gel-like material.

In the display device according to the present embodiment, the display device 1, light sources 2, optical members, and other parts are accommodated in the enclosure 6 having the pedestal portion 6A, for example, as shown in FIG. 1 such that the upper side 1A of the display panel 1 is placed on the upper side of the display device, in other words, on the top side of the display screen.

The light sources 2 may be regularly spaced from each other as in a related-art display device. Preferably, however, the space LG1 between the optical members near the first end is greater than the space LG2 near the second end, for example, as shown in FIG. 2.

It is assumed that the display device has input terminals for receiving external signals, a signal-processing circuit for processing the signals received at the input terminals, a circuit for controlling a display provided on the display panel, and other parts (none of which are shown). Since these input terminals and circuits may be identical in configuration with the counterparts of a related-art display device, their detailed description is omitted.

Figure 3:
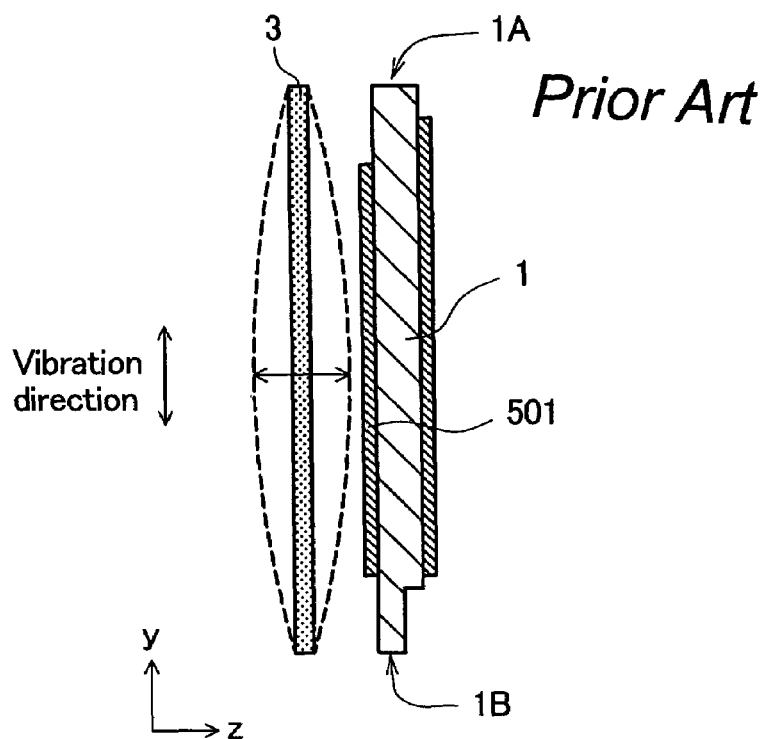
FIG. 3 is a schematic view illustrating the operation and advantages of the display device according to the embodiment, also schematically showing the configuration of a related-art display device similar to the display device according to the embodiment and illustrating the problems.
Figure 4:
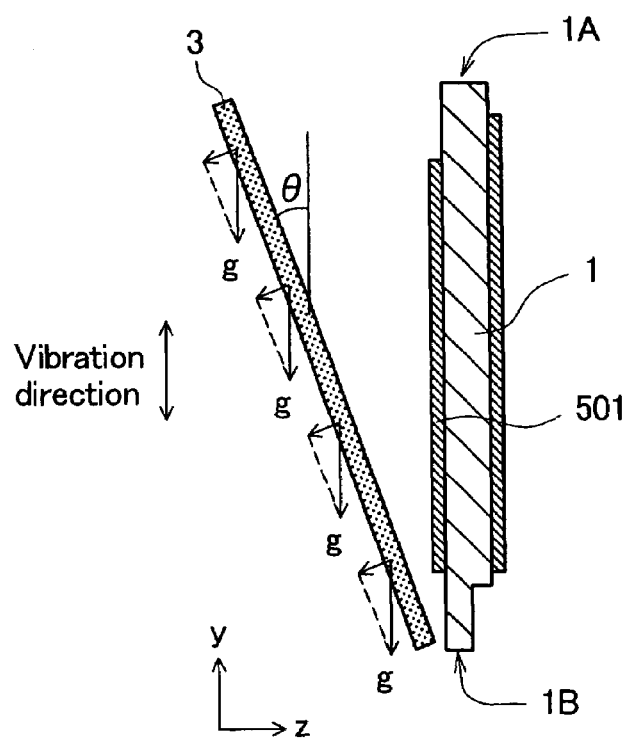
FIG. 4 is a schematic view illustrating the operation and advantages of the display device according to the embodiment.

FIGS. 3 and 4 are schematic views illustrating the operation and advantages of the display device according to the present embodiment. FIG. 3 is a view schematically showing the configuration of a related-art display device similar to the display device according to the present embodiment and illustrating the problem with the configuration of the related-art display device. FIG. 4 is a view illustrating the operation of the display device according to the present embodiment. The geometrical up-and-down relation in FIGS. 3 and 4 is the same as the up-and-down relation in FIG. 2.

In the related-art display device, optical members 3 including a diffusive plate 301 disposed behind the display panel 1 are disposed parallel to the display panel 1, for example, as shown in FIG. 3. Therefore, if vibrations in the y-direction are applied, for example, the optical members 3 swing in the z-direction. There is the problem that if the optical members 3 swing severely in the z-direction, the optical members 3 touch the polarizer 501 stuck to the display panel 1, scratching the polarizer 501. Especially, where the display device is a large-area display device such as a liquid crystal display TV set or a display device for a personal computer, the optical members 3 swing greatly in the z-direction. As a result, the polarizer 501 tends to be easily scratched.

On the other hand, in the case of the display device according to the present embodiment, the optical members 3 including the diffusive plate 301 are disposed at an angle to the display panel 1 such that the distance between the end at a side of the upper side 1A of the display panel and the display panel 1 is greater than the distance between the end at a side of the lower side 1B of the display panel and the display panel 1, for example, as shown in FIG. 4. Gravity g directed in the −y-direction is applied to the optical members 3 as shown in FIG. 4. The gravity g is distributed to various regions on the optical members 3. Even when the optical members 3 are at rest, the optical members undergo a force directed obliquely downwardly as viewed from the direction of the optical sources (not shown) as shown in FIG. 4 by the effect of the gravity g. Therefore, if vibrations in the y-direction are applied, for example, the optical members 3 swing in the z-direction, thus preventing them from touching the polarizer 501. As a result, the polarizer 501 stuck to the display panel 1 can be prevented from being scratched.

The angle of tilt θ of the optical members 3 such as the diffusive plate 301 may be several degrees. Preferably, the angle is set, for example, to 1° to approximately 5°.

Figure 5:
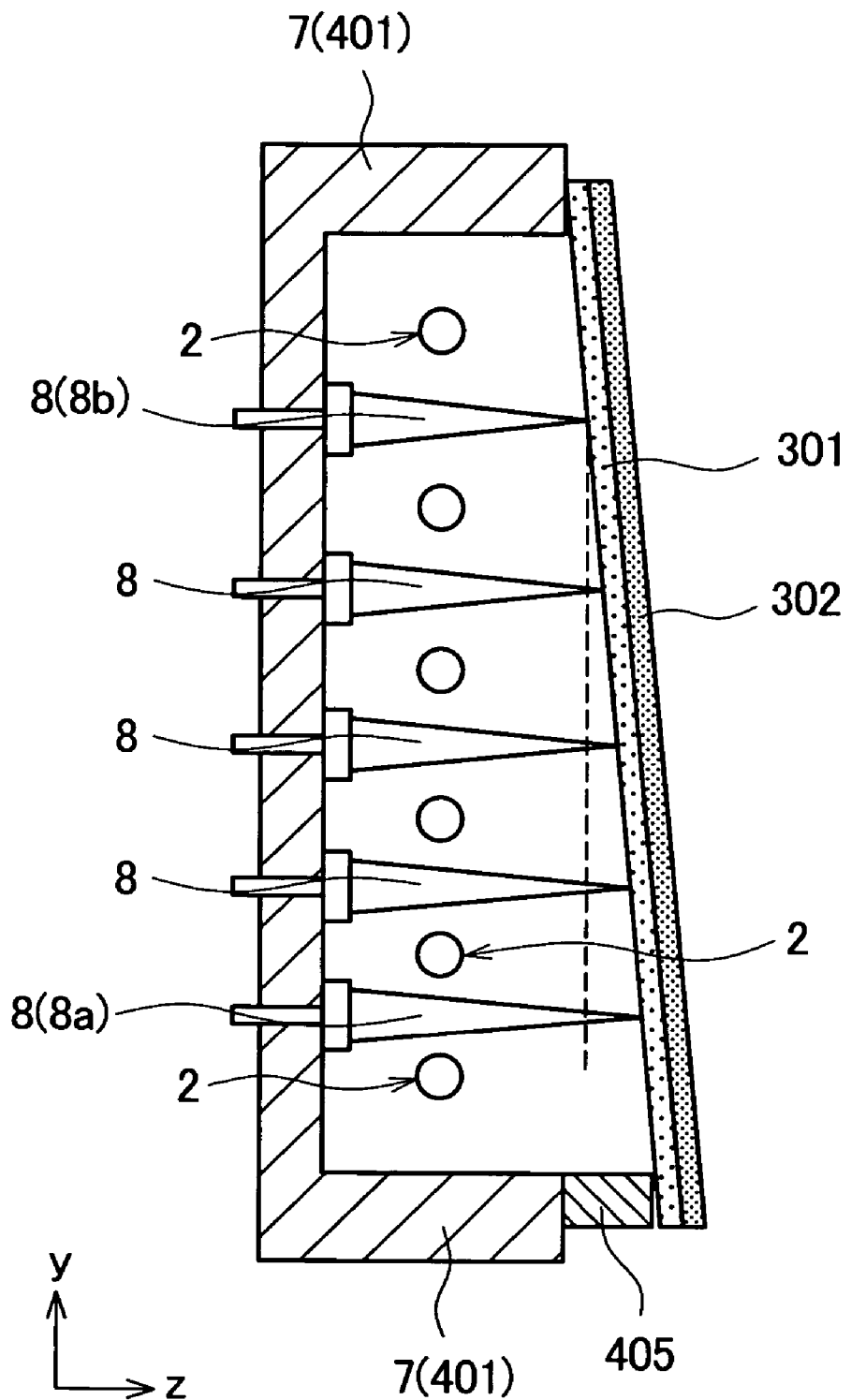
FIG. 5 is a schematic cross section of other example of configuration of the display device according to the embodiment of the invention, especially showing an example of structure of support members.
Figure 6:
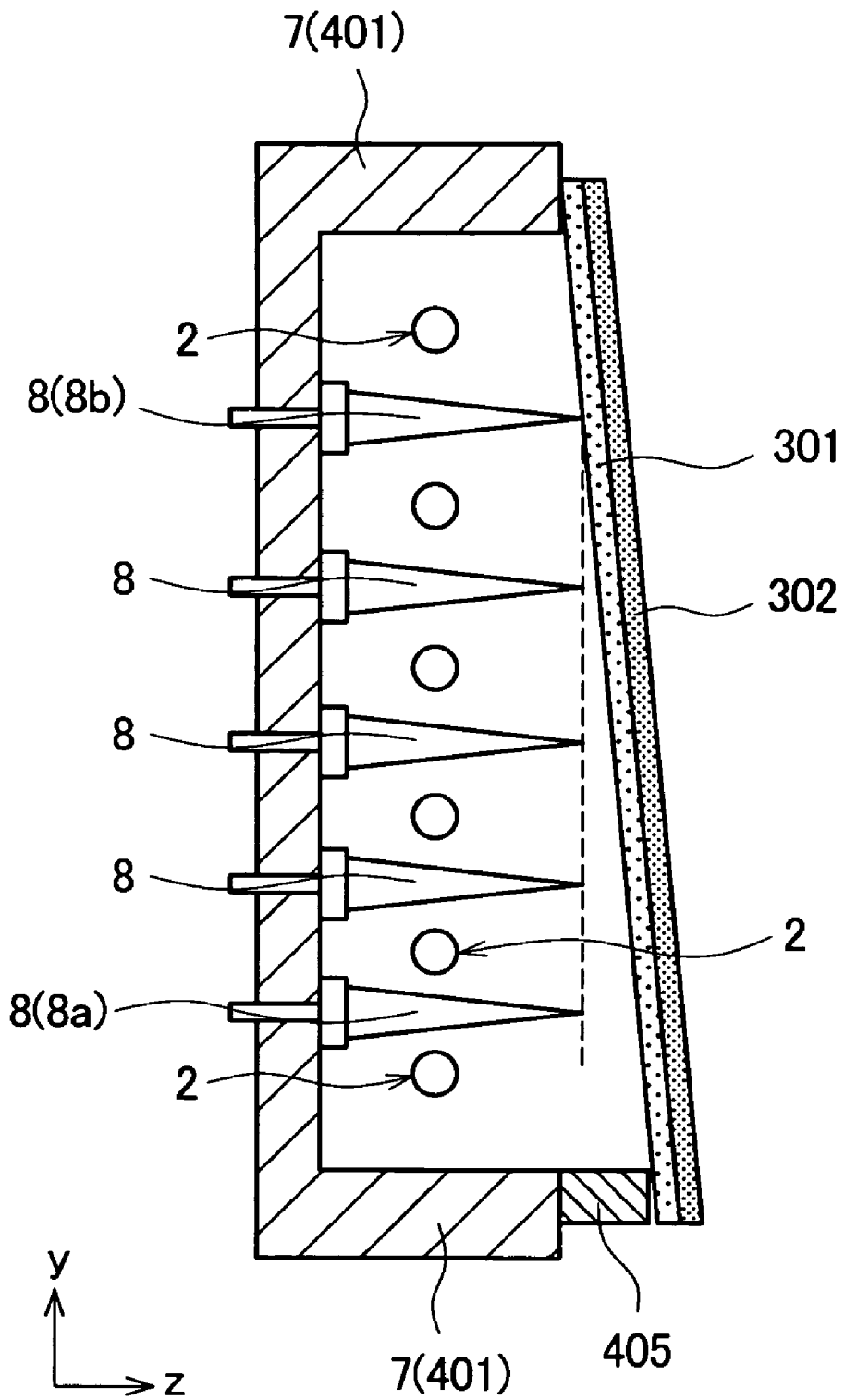
FIG. 6 is a schematic cross section of a further example of configuration of the display device according to the embodiment of the invention, especially showing another example of structure of support members.

FIGS. 5 and 6 are schematic views illustrating another example of the configuration of the display device according to the present embodiment. FIGS. 5 and 6 are cross-sectional views illustrating an example of the structure of support members. The geometrical up-and-down relation in FIGS. 5 and 6 is the same as in the relation in FIG. 2.

Where optical members 3 (301 and 302) and light sources 2 are disposed behind the display panel 1 as in the display device according to the present embodiment, a reflective plate 7 is mounted behind the light sources 2, for example, as shown in FIG. 5. Normally, pin-molded support members 8 stand upright from the reflective plate 7. The support members 8 support the optical members 301, 302 and light sources (fluorescent lamps) 2. Therefore, where the optical members 301 and 302 are disposed obliquely as in the display device according to the present embodiment, the height of the support member 8 (8A) supporting vicinities of the second ends of the optical members 301 and 302 is preferably set greater than the height of the support member 8 (8B) supporting the vicinities of the first ends, for example, as shown in FIG. 5.

Preferably, the support members 8 are made different in height as shown in FIG. 5. However, they may be identical in height as shown in FIG. 6.

As described so far, in the display device according to the present embodiment, when the optical members 3 including the diffusive plate 301 are disposed behind the display panel 1, the distance between the end of each optical member near the upper side 1A of the display panel and the display panel 1 is set greater than the distance between the end of each optical member near the lower side 1B of the display panel and the display panel 1. Thus, if vibrations are applied to the display device, swinging motion of the optical members 3 is lessened. Consequently, the polarizer 501 stuck to the display panel 1 or the optical members 3 are prevented from being scratched.

Where pillar-like fluorescent lamps are used as the light sources 2 and the plural fluorescent lamps are arranged vertically on the viewing screen as in the display device according to the present embodiment, the diffusivity for light can be made uniform by making the spacing between the lamps near the upper side of the viewing screen greater than the spacing between the lamps near the lower side of the viewing screen. Brightness nonuniformity across the viewing screen can be prevented. In the present embodiment, the spacing between the fluorescent lamps is made nonuniform. The present invention is not limited to this arrangement. The lamps may also be arranged at regular intervals.

In the description of the present embodiment, a liquid crystal display panel is used as the display panel 1 in the display device. The present invention is not limited to this structure. The invention can be applied to any display device which displays an image by causing light emanating from the light sources 2 located behind the display panel 1 to pass through the display panel 1 after diffusing the light from the light sources 2 by the optical members 3.

While the present invention has been described in detail so far based on the above-described embodiment, the present invention is not limited to the embodiment. Of course, various changes and modifications are possible within the scope not deviating from the gist.

What is claimed is:

1. A display device comprising:
a display panel;
a light source located behind the display panel; and
optical members disposed between the display panel and the light source,
wherein each of the optical members having a first end and a second end opposite to the first end, the first end is located near an upper side of the display panel, and the second end is located near a lower side of the display panel;

a distance from the first end of said each optical member to the display panel is greater than a distance from the second end thereof to the display panel; and the display panel consists of a liquid crystal panel.

2. A display device according to claim 1, wherein the light source is arranged on a plane, the display panel is positioned in parallel with the plane.

3. A display device according to claim 2, wherein the plane is positioned vertically.

4. A display device as set forth in claim 1, wherein the light source has a plurality of fluorescent lamps which are elongated along a direction perpendicular to a direction from the first end to the second end; and a space between neighboring fluorescent lumps in a vicinity of the first end is wider than a space between neighboring fluorescent lumps in a vicinity of the second end.

5. A display device as set forth in claim 1, further including a reflective plate disposed in the light source and support members are fixed to the reflective plate;

wherein each of the support members is mounted between two neighboring ones of the fluorescent lamps; and a height of support members in a vicinity of the first end is lower than a height of support members in a vicinity of the second end.

6. A display device as set forth in claim 1, further including a reflective plate disposed in the light source, and support members are fixed to the reflective plate, wherein each of the support members is mounted between two neighboring ones of the fluorescent lamps and has an identical a height.

7. A display device as set forth in claim 1, wherein the display panel, the optical members, and the light source are held by frame members, and each of the frame members has a first spacer interposed between a vicinity of the first end of one of the optical members and the display panel and a second spacer interposed between a vicinity of the second end of one of the optical members opposite to the first end and the light source.

8. A display device according to claim 1, wherein the display panel is positioned vertically, and the optical members are positioned non-vertically.

\* \* \* \* \*